May 18, 1954 — L. R. PISTOLES — 2,678,501
GAUGE
Filed July 16, 1948 — 2 Sheets-Sheet 1
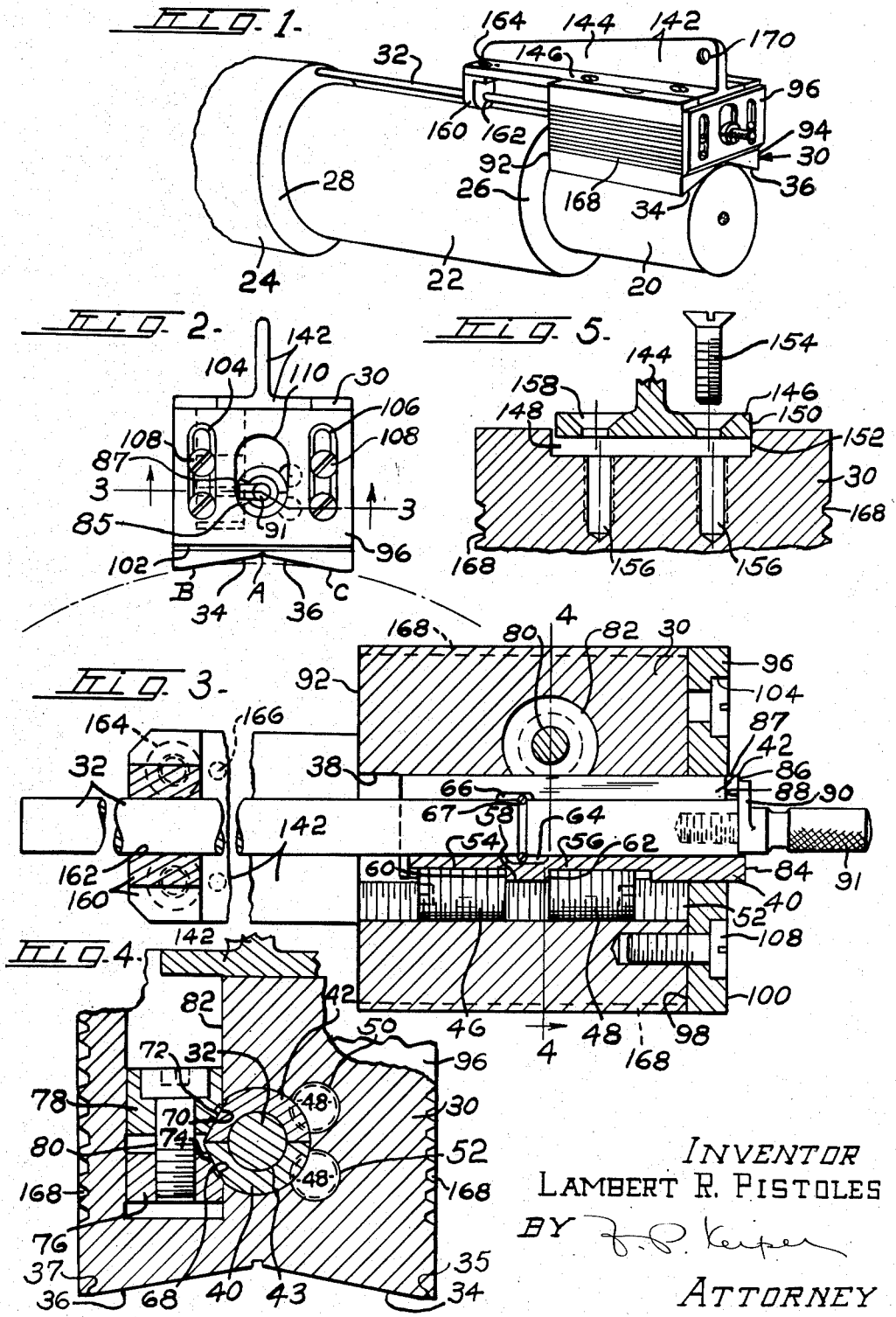
INVENTOR
LAMBERT R. PISTOLES
BY
ATTORNEY May 18, 1954     L. R. PISTOLES     2,678,501
GAUGE
Filed July 16, 1948     2 Sheets-Sheet 2
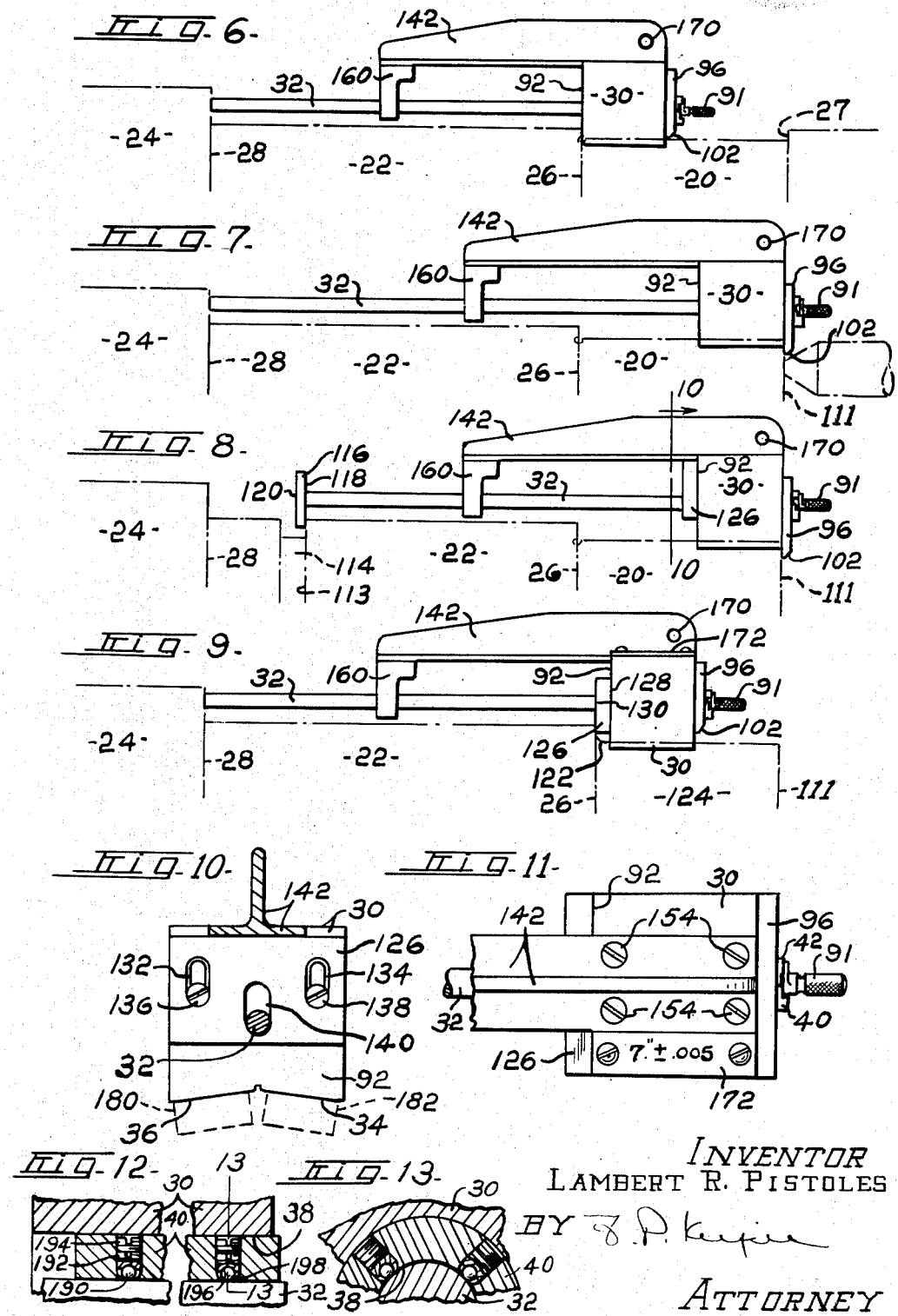
INVENTOR
LAMBERT R. PISTOLES
ATTORNEY Patented May 18, 1954

2,678,501

UNITED STATES PATENT OFFICE 2,678,501

GAUGE

Lambert R. Pistoles, Wilmington, Del.

Application July 16, 1948, Serial No. 39,138

8 Claims. (Cl. 33—169)

This invention relates to gages, and more particularly to gages similar to flush pin gages and especially adapted for gaging length.

In copending applications Serial No. 704,347, filed October 19, 1946, and Serial No. 30,069, filed May 29, 1948, now Patent No. 2,597,030, issued May 20, 1952, there are shown flush pin gages of a novel form principally adapted for setting to any desired dimension for the purpose of gaging depth. While the gages shown are readily adaptable to many uses and variations, they are not in the form shown so readily adaptable to the gaging of extreme lengths, or lengths parallel to the axis of turned bodies, as distances between shoulders, a shoulder and annular groove, or various combinations of the foregoing including the end surface of such a turned body.

It is accordingly an object of the present invention to provide a settable gage capable of accurate alignment upon round or similar objects for gaging lengths between transversely spaced surfaces upon such objects.

A further object of the invention is to provide a gage of the type which is readily brought into alignment with the axis of an object to be gaged.

A still further object of the invention is to provide a gage of the type described which is readily settable, rugged when set, easy to use and economical to manufacture.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a perspective view of a gage embodying the invention, being utilized to gage the length between successive stepped shoulders;

Figure 2 is an end view of the gage of Figure 1;

Figure 3 is an enlarged longitudinal sectional view taken substantially on the line 3—3 of Figure 2;

Figure 4 is a transverse sectional view taken substantially on the line 4—4 of Figure 3;

Figure 5 is a fragmentary transverse sectional view showing a bracket attachment detail;

Figure 6 is a view illustrating a use of the gage to measure length between shoulders of a turned work piece;

Figure 7 is a view illustrating a use of the gage to measure length between a shoulder and the end of a turned work piece;

Figure 8 is a view illustrating the use of the gage to measure length between an annular groove and the end of a turned work piece;

Figure 9 is a view illustrating the use of the gage to measure length between a rectangular shoulder and a filleted shoulder;

Figure 10 is a section of the gage taken on line 10—10 of Figure 8, showing the block employed in the gaging operation of Figure 9;

Figure 11 is a top view showing the method employed for tagging or applying setting indicia upon the gage;

Figure 12 is an enlarged fragmentary sectional view of a modified aligning means; and Figure 13 is a sectional view taken on the line 13—13 of Figure 12.

Referring to Figure 1, wherein the gage is applied to a turned work piece, it is desired to gage a plurality of pieces having cylindrical portions 20, 22 and 24, separated by plane annular surfaces or shoulders 26 and 28. It will be seen that for accurate gaging, it is imperative that the gage operate in parallelism to the axis of the work piece. For this purpose, the block 30, in which the gage rod 32 is slidably mounted, is provided with a pair of intersecting plane surfaces 34 and 36, bearing an obtuse angle with respect to one another, and forming a relatively shallow dihedral. The plane surfaces 34 and 36 are adapted to contact any cylindrical surface along two parallel lines of tangency B and C, which lines will always be parallel with the intersection A of the said planes, and parallel with the axis of the turned work piece. The block is provided with a cylindrical bore 38, whose axis lies parallel to the intersection A of the planes. Within the bore are a pair of half sleeves 40 and 42, forming a smaller concentric bore 43 in which is slidably positioned the gage pin 32. The half sleeves and gage pin described correspond in detail with the similar parts shown in application Serial No. 30,069, and may if desired be formed similar to that shown in application Serial No. 704,347.

Each of the half sleeves 40 and 42 is adapted to be secured in set positions by opposed socket head screws 46 and 48 lying in the respective threaded bores 50 and 52, which bores intersect the bore 38, and cooperate with complemental recesses 54 and 56 in each of the respective sleeves. The recesses are interrupted by a shoulder 58 having transverse surfaces against which the screws 46 and 48, with their squared ends 60 and 62, bear to clamp the respective sleeves in set position. Each of the sleeves is provided with a shallow half annular groove 64 and 66, respectively, of a length sufficient to provide a suitable amount of endwise movement of the gage pin, the latter being fitted with an annular groove containing a spring ring 67, also partially lying in the grooves 64 and 66. Each of the sleeves has flat surfaces 68 and 70 engaged by wedge surfaces 72 and 74 of a clamping device constituted by a nut 76 and collar 78 clamped together by a screw 80, and all lying within a transverse bore 82.

When the proper length of gage pin is selected for a particular dimension, the sleeves 40 and 42 are positioned with their end gaging surfaces 84 and 86 so spaced as to define desired tolerance limits; and the end of the gage pin as represented by the under surface 88 of the hand or wing 90, will lie midway therebetween when gaging a part whose dimension is correct. The ends 84 and 86 are cut away as at 85 and 87 to provide a clear space for slight angular movement of the hand 90.

For example, in Figure 1 or Figure 6, the end face 92 of the block, which face is at right angles to the pin axis, is butted against the shoulder 26, while the end of the gage pin is butted against the shoulder 28. At the same time, the block is saddled upon the cylindrical surface 20, so that the pin is parallel with the axis of the work piece being gaged. With the gage sleeves set properly for desired tolerance, if the gage pin can be rotated through approximately one-half revolution by manipulating the knurled knob 91 so that the hand will pass over the top 86 of one sleeve, but strike the end 84 of the other sleeve without clearing, while the pin end lies against the shoulder 28 and the block end face 92 lies against the shoulder 26, then the work piece is within the tolerance provided. Should the hand not clear either half sleeve and, as evidenced by slight movement only, then the length between the shoulders is greater than the tolerance; and if the hand can rotate clear of both sleeve ends, the length is less than the tolerance.

The other end of the block 94 is parallel with the face 92 and may in instances be employed to abut a shoulder such as 27 (see Figure 6) for gaging a dimension between such shoulder and any other shoulder such as 28. However, there is preferably secured to the end 94 a slidable plate 96 having parallel faces 98 and 100, and a beveled edge 102. The plate is provided with parallel slots 104 and 106 secured by screws 108 threaded in the block 30, and an elongated aperture 110 to clear the sleeves 40 and 42. The plate may readily be shifted to a position such as shown in Figure 7 or 8 to engage the end face 111 of a work piece for gaging the distance between such face and, for example, the shoulder 28, or the side wall 113 of an annular groove 114, as shown in Figure 8. In the latter case, the gage rod is provided with a disk head 116 having parallel surfaces 118 and 120, arranged perpendicular to the axis of the gage rod.

The shoulders 26 of Figure 6, may be filleted as shown at 122 of Figure 9. In order for the dihedral to seat squarely upon the cylindrical part 124 a safe distance from the fillet 122 which would otherwise disturb the accurate seating of the block with the gage pin in parallelism, a spacer block 126 having parallel faces 128 and 130 may be secured to the forward face 92 of the block 30. In Figure 10, such block is shown as provided with slots 132 and 134 for reception of screws 136 and 138 threaded into block 30, and a slot 140 to clear the gage pin 32. The spacer block will normally be set at a proper distance where used as in Figure 9, so that it will only engage the surface adjacent the fillet, which is a plane surface, and care will be exercised to assure that the fillet curvature is adequately spaced from contact with the spacer block.

Since the gage is adapted for lengths, it is desirable to adequately support the free end of the gage pin 32, for which purpose the bracket 142 is provided. The bracket may be of T-section for rigidity with the web 144 gradually decreasing in height for lightness. The bracket may be of any length as appears essential to provide adequate support to the pin. The flange part 146 of the T-section will preferably be received in a groove 148 in the top face of the block 30, of a depth to provide a flush fit. The flange part may be provided with a true edge 150 adapted for engaging a true edge 152 (parallel with the gage pin axis) of the groove 148. The bracket is secured to the block by a plurality of flat head screws 154. The threaded bore 156 for receiving such screws is offset a few thousandths of an inch laterally from the screw head apertures 158 in the flange of the T-member, so that the under cones of the flat head screws will cause the bracket edge 150 to draw over into tight accurate engagement with the mating edge 152 (see Figure 5).

The outer end of the bracket carries a pin guide angle piece 160 having an aperture 162 for the pin in accurate alignment with the sleeve bore 43. The angle piece 160 is secured to the bracket by screws 164, and dowel pins 166, if desired. The block may be grooved as at 168 to provide a grip, and the web 144 of the bracket may be provided with an aperture 170 for convenient hanging on a hook, in a manner least liable to injure the gage or any setting thereof.

The obtuse angle of the dihedral may be in the order of 165°, or any angle as may be found desirable, and adapted to engage a wide range of diameters, while the block may be of a size convenient for handling and in many instances of a size approximately 1½ inches across. The bore for the half sleeves and gage rod will be located relatively close to the dihedral, but through the use of disks (see Figure 8) such spacing need not be too close. On the other hand, the dihedral faces 34 and 36 may, if desired, be built up by securing thereto, as by screws, additional blocks such as 180 and 182 (see Figure 10) whose opposite faces are parallel. The gage may be supplied with a plurality of standard size brackets, and gage rods, varying in length by inches or half inches, if desired. The half sleeves, being settable within the block over a considerable distance, make it possible to set the gage for any dimension with a minimum of parts to select from. Likewise, the end block 96 may vary in width so as to conveniently reach a surface axially inward a distance from the cylindrical surface engaged by the dihedral. In practice, several plates of varying width may be furnished together with rods and brackets in the form of a set.

When set, the gage is rugged, capable of retaining a setting and adapted to accurately determine on rapid inspection the length of a work piece, particularly as to whether the dimension lies within the allowable tolerances. By use of a suitable label plate 172, the gage setting may be indicated, and the setting may not be altered without removal thereof first. In practice, the bore 82 and other cavities such as threaded bores 50 and 52 may be filled with beeswax to form a protective seal against change of setting by unauthorized persons.

In order to assure perfect alignment of the pin 32 within the bore 38 of the split sleeves 40 and 42, four ball point contacts may be provided in one of the sleeves to eliminate substantially all clearance. As shown in Figures 12 and 13, each of such contacts may comprise a ball 190 backed up by beadless screws 192 and 194 adapted to jam against one another. Each ball is partially received in a socket 196 in the end of the screw 192, and is prevented from dropping out by a shoulder 198.

The gage surfaces 34 and 36 may merge into narrow marginal flat surfaces 35 and 37 lying in a common plane, if desired. The gage block ordinarily will make tangential contact with cylindrical surfaces, but where the radius of the surface is great, contact will be had along the lines of intersection between plane surfaces 36 and 37 and 34 and 35. The plane surfaces 35 and 37 will provide lines of contact to enable the gage to contact cylindrical surface of any radius, and even of infinite radius, which latter is the equivalent of a plane surface. Thus, the gage may be employed to measure distances between parallel stepped surfaces. Axial alignment under these circumstances is assured by conjoint contact of the surfaces 35 and 37 and an end surface such as 92, or other parallel surface such as 98, with a pair of surfaces of the work, at right angles to each other.

The blocks 180 and 182 may be of wedge shape longitudinally thereof, if desired, so as to contact a taper, along elemental lines of contact converging at the axis of the work piece. In such case, the axis of the bore 38 will bear such relation as to be held parallel to such work piece axis or the common axis of such elemental lines of contact, when the blocks are in line contact with the taper.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a tolerance measuring gage, a block having a shallow dihedral on one side thereof formed by two plane surfaces having an angle of less than 180° therebetween and adapted to engage simultaneously and tangentially an external cylindrical surface, a bore in said block parallel thereto, a plane gaging surface on said block extending perpendicular to said bore, a pair of half sleeves in said bore providing a second concentric bore, means for rigidly locking said half sleeves against movement in said bore, a gage pin freely slidable in said second bore at all times, and flush pin indicating surfaces carried by said pin and half sleeves.

2. In a tolerance measuring gage, a block having a shallow dihedral surface adapted to engage a circular object along two elemental lines of tangency, a bore in said block parallel to the common axis of said elemental lines, an elongated gage pin freely slidably mounted in said bore for movement parallel with said axis, flush pin means for determining the relative position of said pin and said block, and bracket means secured to said block having a slidable support for said pin spaced from said block and a gaging face on the block and the pin, said faces extending perpendicular to the line of said parallel movement.

3. In a tolerance measuring gage, a block having a surface adapted to contact a cylindrical surface along two spaced parallel lines of contact, said block having a plane surface perpendicular to such two spaced parallel lines of contact, a plate having a plane surface engaging said block plane surface and adapted to be secured to said block with a portion of said plane surface overhanging said first named block surface, a gage pin freely slidably mounted in said block on an axis parallel with said parallel lines, said pin having a gaging surface transverse to its axis, and flush pin indicating surfaces carried by said block and an end of said pin for indicating the distance between said gaging pin and plate surfaces.

4. In a tolerance measuring gage, a block having a surface adapted to engage an external cylindrical object along two parallel lines of tangency, a gage pin freely slidably mounted in said block for movement parallel with said lines of tangency, settable means secured to the block and having surfaces cooperating with one end of said pin for determining the relative position of said pin and said block for gaging a dimension within predetermined tolerances, and means coacting between said settable means and the pin to restrict the movement of said pin with respect to said block to a range including the range between the predetermined tolerances.

5. In a tolerance measuring gage, a block having a shallow dihedral on one side thereof formed by two plane surfaces having an angle of less than 180° therebetween and adapted to engage simultaneously and tangentially an external cylindrical surface, a bore in said block parallel thereto, a pair of half sleeve members in said bore providing a second concentric bore, a gage pin at all times freely slidable in said second bore, means for independently securing said members axially thereof, and flush pin gaging surfaces carried by said pin and sleeve members.

6. In a tolerance measuring gage, a block having a shallow dihedral on one side thereof formed by two plane surfaces having an angle of less than 180° therebetween and adapted to engage simultaneously and tangentially an external cylindrical surface, a bore in said block extending substantially parallel thereto, a pair of half sleeve members in said bore providing a second concentric bore, a gage pin at all times freely slidable in said bore, means for independently setting said members axially thereof, additional means for securing said members in set position, and flush pin gaging surfaces carried by said pin and half sleeves.

7. In a tolerance measuring gage, a block having a shallow dihedral on one side thereof formed by two plane surfaces having an angle of less than 180° therebetween and adapted to engage simultaneously and tangentially an external cylindrical surface, a bore in said block extending substantially parallel thereto, a pair of half sleeve members in said bore providing a second concentric bore, means for securing said members axially thereof, a gage pin at all times freely slidable in said bore, means for limiting the sliding movement of said gage pin to a predetermined range and transverse flush pin gaging surfaces carried by said pin and half sleeves.

8. In a tolerance measuring gage, a block having a shallow dihedral on one side thereof, a bore in said block extending substantially parallel thereto, sleeve means freely slidable in said bore and settable axially along the length thereof and providing a second concentric bore, a gage pin freely slidable at all times in said sleeve, flush pin gaging means on one end of said sleeve means and one end of said pin, said block having a plane surface perpendicular to said bore axis, and a plate having a plane face settably secured against said plane surface with said face overhanging and intersecting the planes of said dihedral.

References Cited in the file of this patent

UNITED STATES PATENTS

| Number | Name | Date |
|---|---|---|
| 437,225 | McDuff et al. | Sept. 30, 1890 |
| 548,329 | Stemmerich | Oct. 22, 1895 |
| 565,579 | Topping | Aug. 11, 1896 |
| 742,077 | Sovelius | Oct. 20, 1903 |
| 1,298,866 | Beach | Apr. 1, 1919 |
| 1,602,645 | Buckingham | Oct. 12, 1926 |
| 1,667,809 | Kersaw | May 1, 1928 |
| 2,363,165 | Vierling | Nov. 21, 1944 |
| 2,401,085 | LaValley | May 28, 1946 |
| 2,466,185 | Stoothoff | Apr. 5, 1949 |

FOREIGN PATENTS

| Number | Country | Date |
|---|---|---|
| 74,645 | Switzerland | Mar. 16, 1917 |
| 359,631 | Germany | Sept. 25, 1922 |
| 554,316 | Great Britain | June 29, 1943 |
| 565,544 | Great Britain | Nov. 15, 1944 |

OTHER REFERENCES

Publ.: Machinery, page 911, July 1926.